(12) United States Patent
Drautz et al.

(10) Patent No.: US 12,092,461 B2
(45) Date of Patent: Sep. 17, 2024

(54) METHOD FOR DETERMINING, MEASURING AND/OR MONITORING PROPERTIES OF A SENSOR SYSTEM

(71) Applicant: Robert Bosch GmbH, Stuttgart (DE)

(72) Inventors: Frank Drautz, Kirchentellinsfurt (DE); Paolo Minotti, Tuebingen (DE); Clemens Jurgschat, Stuttgart (DE); Alexander Sorger, Dresden (DE); Michael Schiebold, Chemnitz (DE); Natalie Koerte, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 298 days.

(21) Appl. No.: 17/652,121

(22) Filed: Feb. 23, 2022

(65) Prior Publication Data
US 2022/0282971 A1   Sep. 8, 2022

(30) Foreign Application Priority Data

Mar. 5, 2021   (DE) ...................... 10 2021 202 134.4

(51) Int. Cl.
*G01C 25/00*   (2006.01)
*G01C 19/5712*   (2012.01)
(Continued)

(52) U.S. Cl.
CPC ..... *G01C 19/5726* (2013.01); *G01C 19/5712* (2013.01); *G01C 25/00* (2013.01);
(Continued)

(58) Field of Classification Search
CPC ............ G01C 19/5726; G01C 19/5712; G01C 25/00; G01C 19/5776; G01C 25/005;
(Continued)

(56) References Cited

U.S. PATENT DOCUMENTS

| 9,834,438 B2 | 12/2017 | Dar et al. | |
| 2011/0153251 A1* | 6/2011 | Classen | G01C 19/5726 73/1.37 |

(Continued)

FOREIGN PATENT DOCUMENTS

| DE | 102015216806 A1 | 3/2017 |
| DE | 102018207573 A1 | 11/2019 |

*Primary Examiner* — David J Bolduc
(74) *Attorney, Agent, or Firm* — NORTON ROSE FULBRIGHT US LLP; Gerard A. Messina

(57) ABSTRACT

A method for determining, measuring and/or monitoring properties of a sensor system. In the method, a controlled change of at least one system parameter of the sensor system takes place in such a way that prior to the controlled change, the system parameter includes a first value and assumes at least one further value as a result of the controlled change. At least one characteristic variable of the sensor system and/or a change of the at least one characteristic variable of the sensor system is/are determined for the at least one further value of the system parameter. The determination, measuring and/or monitoring of properties of the sensor system take place based the at least one further value of the system parameter and the at least one characteristic variable determined in the second step and/or the change of the at least one characteristic variable.

21 Claims, 3 Drawing Sheets

(51) Int. Cl.
  *G01C 19/5726* (2012.01)
  *G01D 5/00* (2006.01)
  *G01D 18/00* (2006.01)
  *G01C 19/5776* (2012.01)

(52) U.S. Cl.
  CPC ............... *G01D 5/00* (2013.01); *G01D 18/00* (2013.01); *F16F 2228/04* (2013.01); *F16F 2228/066* (2013.01); *F16F 2230/0017* (2013.01); *F16F 2230/08* (2013.01); *G01C 19/5776* (2013.01)

(58) Field of Classification Search
  CPC ....... G01D 5/00; G01D 18/00; F16F 2228/04; F16F 2228/066; F16F 2230/0017; F16F 2230/08
  See application file for complete search history.

(56) References Cited

U.S. PATENT DOCUMENTS

| | | | | |
|---|---|---|---|---|
| 2012/0118062 A1* | 5/2012 | Gunthner | ........... | G01C 19/5712 73/504.12 |
| 2012/0186345 A1* | 7/2012 | Bauer | .................... | G01C 25/00 73/504.12 |
| 2013/0199263 A1* | 8/2013 | Egretzberger | ..... | G01C 19/5726 73/1.38 |
| 2013/0283911 A1* | 10/2013 | Ayazi | .................... | G01C 19/56 73/504.12 |
| 2014/0000366 A1* | 1/2014 | Blomqvist | .......... | G01C 19/5776 73/504.12 |
| 2014/0074418 A1* | 3/2014 | Lin | ......... | G01P 21/00 73/1.37 |
| 2014/0083164 A1* | 3/2014 | Homeijer | ............. | B81C 99/003 73/1.82 |
| 2014/0116108 A1* | 5/2014 | Franke | ............... | G01C 19/5755 73/1.37 |
| 2014/0260508 A1* | 9/2014 | Dar | ....... | B81C 99/003 73/1.01 |
| 2016/0167961 A1* | 6/2016 | Dar | ......... | G01P 21/00 73/1.37 |
| 2017/0023364 A1* | 1/2017 | Gregory | ................ | G01P 21/00 |
| 2019/0277656 A1* | 9/2019 | Painter | ................ | G01C 25/005 |
| 2019/0277871 A1* | 9/2019 | Sato | ....................... | G01P 1/006 |
| 2020/0116487 A1* | 4/2020 | Ward | ................ | G01C 19/5726 |
| 2021/0033437 A1* | 2/2021 | Visconti | ............... | G01D 18/002 |
| 2021/0278213 A1* | 9/2021 | Aaltonen | ............ | G01C 19/5776 |
| 2021/0302163 A1* | 9/2021 | Jurgschat | ............ | G01D 18/00 |

* cited by examiner

METHOD FOR DETERMINING, MEASURING AND/OR MONITORING PROPERTIES OF A SENSOR SYSTEM

CROSS REFERENCE

The present application claims the benefit under 35 U.S.C. § 119 of German Patent Application No. DE 10 2021 202 134.4 filed on Mar. 5, 2021, which is expressly incorporated herein by reference in its entirety.

FIELD

The present invention is directed to a method for determining, measuring and/or monitory properties of a sensor system.

BACKGROUND INFORMATION

A common method for achieving the required precision and accuracy in sensor systems is a so-called end adjustment (or end-of-line calibration), which is carried out directly following the manufacturing process. In this method, deviations from the desired behavior are established, for example, by determining the sensor response for a reference stimulus (in the case of inertial sensors, for example, a permanently predefined external acceleration or rotation rate), and comparing it with the associated setpoint value. In the process, the properties of the sensor are checked and, if necessary, it is ensured through subsequent trimming that the required accuracy is achieved.

Similar checks may be carried out repeatedly during the entire service life of the sensor. In order to avoid the additional effort, however, which results from the sensor having to be exposed for this purpose to a defined reference stimulus, such self-calibrations are usually based on the use of a test signal. Thus, for example, a calibration method is described in U.S. Pat. No. 9,834,438 B2, in which an electronic stimulus-signal is generated and a new trim value is subsequently calculated by a comparison with an expected value. Furthermore, a method is described in German Patent Application No. DE 10 2018 207 573 A1 for recalibrating a sensor with the aid of a defined test signal, the correction of the sensor signal taking place on the basis of a previously determined correlation as a function of the sensor response to the test signal.

All methods of this type have, in addition to the added effort for generating a test signal, the disadvantage that they are also prone to errors relating to the generation of the test signal. Typically, for example, changes to which the sensor is subjected as a result of the operating conditions or also as a result of ageing effects over time, affect not only the sensor properties that are to be calibrated, but also the generation of the test signal used for this purpose. In general, no clear differentiation of these effects is possible, as a result of which the achievable accuracy and robustness of the self-calibration is limited.

SUMMARY

An object of the present invention is to provide a method, which may be implemented without a reference stimulus or a test signal.

A method according to the present invention may have the advantage over the related art that the sensor properties may be determined or checked solely on the basis of a dedicated change of system parameters and of a corresponding processing of the sensor response, without an external reference stimulus or a test signal being necessary for this purpose. By changing the system parameter such as, for example, an operating parameter of the sensor, one or multiple control signals, etc., the state of the sensor is influenced or adjusted in a targeted manner and the state change thus produced is quantified based on one or on multiple characteristic variables. The change of the parameter takes place in this case in a previously established reproducible manner, so that via the influence of the parameter change on the characteristic variable, it becomes possible to draw a conclusion about the sensor properties. This approach may be used not only for a self-calibration of the sensor, but also for measuring, identifying and/or monitoring properties of the sensor without the sensor having to be removed from its operating surroundings for such purpose.

According to the present invention, at least one system parameter, in addition to its original, uninfluenced value, assumes at least one further value and the influence on the sensor system may be determined via at least one characteristic variable. In general, however, the method allows for significantly more general designs, in which multiple parameters are incrementally changed and in each case a plurality of characteristic variables is determined. This scheme may be formally described as follows: The sensor system includes one or multiple parameters $P_i$, $i=1, \ldots, n$, which may be changed in an established manner and, in particular, may assume in each case various values $P_i(W_j)$, $j=1, \ldots, n_i$. Prior to carrying out the method, the parameters have an initial value $P_i(W_1)$ and then gradually assume one or multiple values $P_i(W_1) \to P_i(W_j)$, $j=2, \ldots, n_i$ differing from $P_i(W_1)$. In the process, one or multiple characteristic variables $C_k$, $k=1, \ldots, m$ of the system is/are determined in each step for each value or combination of values of the system parameters, resulting in a data set $C_{k,j_1,\ldots,j_n}$ that contains the respective value of the n-th characteristic variable $C_k$, which results after the change $P_i(W_1) \to P_i(W_j)$ of system parameter $P_i$. This results in a data set $C_{k,j_1,\ldots,j_n}$, which makes it possible to determine or to estimate certain properties E of the sensor $E=f(C_{k,j_1,\ldots,j_n})$ on the basis of an underlying physical understanding or of suitable empirical correlations. This procedure may be repeated at an arbitrary point in time $t_l$, $l=1, \ldots, o$, among other things, a first implementation after the end adjustment, a further implementation after start-up and thereafter at regular intervals during the service life of the sensor is possible. This results in a data set $C(t_l)_{k,j_1,\ldots,j_n}$, which not only allows properties of the sensor to be determined at various points in time $t_l$, but also a change of properties between various points in time $t_{l_1}$, $t_{l_2}$ to be determined $\Delta E(t_{l_1} \to t_{l_2}) = f(C(t_{l_1})_{k,j_1,\ldots,j_n} \to C(t_{l_2})_{k,j_1,\ldots,j_n})$ and to be used for monitoring, diagnosing and self-calibrating the sensor system during the service life.

This general feature in this case allows for numerous specific embodiments, which are described below.

The procedure will initially be further briefly illustrated based on parameter sets of different size. In a simple case, only one single system parameter including three different values could be varied $P(W_j)$, $j=1, 2, 3$ and one single characteristic sensor variable C could be determined. When carrying out the method at an arbitrary point in time $t_l$, this variable then assumes three different values $C(t_l)_1$, $C(t_l)_2$, $C(t_l)_3$. In the case of two varied system parameters including in each case two different possible values $P_i(W_j)$ $i=1, 2$, $j_{1,2}=1, 2$ and also two assumed characteristic sensor variables $C_k$ $k=1, 2$, carrying out the method at an arbitrary point in time $t_l$ would result altogether in a data set of up to eight (depending on the combination of the changes) different values: $c_1(t_l)_{1,1}$, $c_1(t_l)_{2,1}$, $c_1(t_l)_{1,2}$, $c_1(t_l)_{2,2}$ and $C_2(t_l)_{1,1}$, $C_2(t_l)_{2,1}$, $C_2(t_l)_{1,2}$, $C_2(t_l)_{2,2}$.

According to one example embodiment of the method according to the present invention, a change of the properties of the sensor system with respect to a reference state is determined in the third step, the reference state being determined, in particular, during the end adjustment subsequent to the manufacture of the sensor system. In this way, the method may be utilized to determine the change of the properties of the sensor system with respect to a reference state at point in time $t_1$ (cf. FIG. 3) $\Delta E(t_1 \to t_l) = f(C(t_1)_{k,j_1,\ldots,j_n} \to C(t_l)_{k,j_1,\ldots,j_n})$.

According to one further embodiment of the present invention, at least one sensor parameter is changed in a step following the third step, the change of the sensor parameter effectuating, in particular, a correction of a measured signal of the sensor system. In this way, a targeted change of one or of multiple sensor parameters $P_i(W_1) \to P_i(W_{j_i})$ may be carried out in a step following the third step, with the aim of correcting the changed sensor properties $E(t_1, P_i(W_1)) \approx E(t_l, P_i(W_{j_i}))$. A typical application here would be, for example, a self-calibration of the sensitivity of the sensor system carried out at regular intervals, in order to achieve an accuracy preferably constant over the entire service life (cf. FIG. 3).

One further embodiment of the present invention provides that in the third step, a comparison of the characteristic variable of the sensor system determined in the second step and/or the change of the at least one characteristic variable with a threshold value is carried out, a sensor response being generated, in particular, in a subsequent step. This embodiment (cf. FIG. 4) contains the comparison of a characteristic variable ascertained at a point in time $t_l$ with a defined threshold value. One possible application here would be a monitoring of the correct operability of the sensor system and the triggering of a suitable message to the user in the case of a no longer acceptable deviation.

According to one embodiment of the present invention, the sensor includes a movable structure, which is designed in such a way that a deflection of the movable structure in a detection direction is caused by a physical stimulus acting on the movable structure, in particular, an inertial force or a gas pressure or liquid pressure, the changed system parameter controlled in the first step directly influencing the deflection generated by the physical stimulus and/or a measured signal read out from the sensor system.

According to one embodiment of the present invention, the changed system parameter is a potential present between the movable structure and a readout structure, in particular, an electrode voltage present between an electrode fixed to the substrate and the movable structure of the sensor system. The electrode fixed to the substrate is preferably a detection electrode, i.e., an electrode, which detects the deflection of the movable structure in the detection direction via a capacitance change between the movable structure and the electrode.

According to one embodiment of the present invention, the changed system parameter is an operating temperature of the sensor system, the change of the operating temperature taking place, in particular, as a result of a targeted change of an operating mode of the sensor system or of parts of the sensor system, in particular, of evaluation electronics.

According to one embodiment of the present invention, the characteristic variable determined in the second step corresponds to the measured signal without external physical stimulus.

According to one embodiment of the present invention, the sensor system is a rotation rate sensor and includes a movable structure, which is designed in such a way that it is excitable for carrying out a drive movement, the drive movement proceeding along a drive direction differing from the detection direction. The sensor system may, in particular, be a rotation rate sensor, in which the drive circuit is implemented by an open control loop (open-loop-system). According to one preferred specific embodiment of the present invention, the at least one system parameter in this embodiment is an electrode voltage, in particular, a voltage present at a detection electrode fixed to the substrate. A change of electrical voltage $V_{CM}$ present between the oscillating mass and the detection electrode exerts a strong influence on the mechanical gain $G_{y/F}$ (i.e., on the relationship between detection deflection and Coriolis force), in particular, since this electrostatic tuning influences the natural frequency as a result of the change of the spring constant between the electrode and the mass. The mechanical gain is therefore a function of the electrode voltage:

$$G_{y/F} = f(V_{CM}).$$

Sensor properties such as, for example, the detection sensitivity may now be determined or estimated by gradually changing electrode voltage $V_{CM}$ and measuring the response of the sensor for each of these changes. The change of the detection sensitivity results, in particular, in a change in the curvature of response function $f(V_{CM})$, so that through the curvature conclusions about the detection sensitivity are possible. By determining the response function and by a comparison with a stored progress, which corresponds, for example, to the state after the final trimming at the end of the manufacturing process, it is possible in this way to determine or to estimate the sensitivity drift and thus to derive and correspondingly correct the actual sensitivity. In this sense, the progress of the response function, which is obtained by changing sensor parameter $V_{CM}$, serves as a type of "fingerprint," from which information about the detection sensitivity may be obtained. In this regard, it should be noted that in addition to the response function itself, typically further analytical and empirical parameters are necessary for applying this approach, which may be, in particular, a function of the design of the sensor and of its operating conditions. By applying this method, it is also possible to derive further system variables, in addition to the detection sensitivity. The method for determining the detection sensitivity or its drift represents a self-calibration, in which the deviation with respect to the desired behavior is established, i.e., for example, the deviation with respect to the state of the sensor, which is generated by the final trimming (final trim) in the manufacturing process.

Alternatively, it is also possible to hold voltage $V_{CM}$ constant and instead to vary potential $V_C$ present at the counter electrodes, which are connected to the ASIC readout circuit.

Different counter electrodes, or different phases of the counter electrodes may, in particular, have different potentials $V_{CP} \neq V_{CN}$ and may be independently varied.

According to one embodiment of the present invention, the changed system parameter is an oscillation amplitude of the movable structure.

According to one embodiment of the present invention, the characteristic variable determined in the second step is the phase position of a detection oscillation of the movable structure with respect to a drive oscillation of the movable structure.

According to one embodiment of the present invention, the deflection in the detection direction and the drive movement are coupled in such a way that the drive movement causes a quadrature deflection, which is in phase with the drive movement, the characteristic variable of the sensor system being a quadrature value. It is particularly preferred in this case that the associated system parameter is an electrode voltage. Possible analytical considerations that may apply when using the quadrature value and the electrode voltage for the "fingerprint" of the sensor are outlined below. Quadrature $Q(V_{CM})$ as a function of electrode voltage $V_{CM}$ is made up of various sensor properties, each of which is either a function of the electrode voltage or is independent of the latter. The variables relevant here are mechanical gain $G_{y/F}$ (for the relationship between Coriolis force and deflection in the detection direction) and stiffness $K_{xy}$, which couple the drive movement and the detection movement (x and y) to one another (which may also be a function of electrode voltage $V_{CM}$ if an electrostatic coupling by suitable quadrature electrodes is involved)

$$Q(V_{CM}) \sim K_{xy}(V_{CM}) \cdot G_{y/F}(V_{CM}).$$

Still further variables are incorporated into the quadrature, such as the deflection in drive direction $x(V_{CM})$ also as a function of the voltage, capacity gain (between deflection in the detection direction and capacitance change) $G_{C/y}$ and gains $G_{C/V}$ and $G_{ASIC}$ of the C/V converter and of the ASIC. The influences of a change of the electrode voltage on $x(V_{CM})$ and $G_{C/V}(V_{CM})$ cancel each other out and the remaining factors may be considered to be approximately constant. On the basis of the remaining dependencies in $K_{xy}(V_{CM})$ and $G_{y/F}(V_{CM})$ an analytical correlation between Q and $V_{CM}$ may be deduced, which may be utilized in various specific embodiments of the method.

According to one embodiment of the present invention, it is provided that at least two data points are generated in the third step on the basis of the characteristic variable of the sensor system determined in the second step and/or on the basis of the change of the at least one characteristic variable, a model function being adapted to the data points with the aid of a compensating calculation, the model function including at least one model parameter, which is fixed at a value by the compensating calculation, the determination, measurement and/or monitoring of properties of the sensor system taking place on the basis of the value of the model parameter. The choice of model function in this case may be based, in particular, on the knowledge of the correlation between the system parameter (or of the system parameters) and the characteristic variable (or the characteristic variables). This correlation may be based, for example, on physical understanding of the sensor system, on empirical results or on a combination of the two. The correlation may, in particular, be represented by a mathematical model as a function of model parameters, the model parameters in turn being capable of being fixed at particular values by a compensating calculation (fitting) based on the data points and being used for the method according to the present invention. If it is not the absolute value of the characteristic variable that is of interest here, but the change (drift) of this value over time, the parameter change may be initially carried out in a known state of the system, for example, in the final adjustment at the end of the manufacture or during the initialization or installation for a particular application. The data reflecting this characteristic correlation between characteristic variable and system parameters may then, for example, be stored in a suitable manner. During the service life of the sensor, an analogous method may then be applied (self-calibration) and the drift of the sensor properties may then be determined by a comparison with the stored data.

The system parameter is preferably an electrode voltage and the data points are formed by an inverse of the quadrature value and the associated electrode voltages. The data points may, in particular, be adapted by a quadratic function, the quadratic function including, in particular, two model parameters, which are ascertained by the compensating calculation from the plurality of data points. In this specific embodiment of the method according to the present invention, it may be assumed for the determination of the "fingerprint," for example, that stiffness $K_{xy}$ is only weakly a function of electrode voltage $V_{CM}$ and may therefore be set as constant. Thus, the quadrature is a function of the voltage only via gain $G(V_{CM})$. The index of $G_{y/F}$ is no longer included below since gains other than the mechanical gain no longer appear in the formulas. The quadrature is understood to mean, in particular, the amplitude of the quadrature signal. For the quadrature, the following correlation may be approximately derived:

$$G(V_{CM}) \sim Q(V_{CM}) = \frac{1}{\alpha - \beta V_{CM}^2}$$

This functional form represents a two-parameter model for the dependency of the quadrature on the electrode voltage. The two model parameters $\alpha$ and $\beta$ may be determined by a compensating calculation, in particular, by the inverse $1/Q(V_{CM})$ being fitted by the quadratic function $1/Q(V_{CM}) = \alpha - \beta V_{CM}^2$. Parameters $\alpha$, $\beta$ characterize the progress of $G(V_{CM})$ and are thus, in particular, sensitive with respect to a change of the detection sensitivity. From this arises the possibility of deducing the change of the detection sensitivity and of calculating this change, for example, through an empirical or analytical correlation (see further below).

According to one embodiment of the present invention, a first quadrature voltage is applied between the movable structure and a quadrature electrode fixed to the substrate, and subsequently a second quadrature voltage is applied between the movable structure and a second quadrature electrode fixed to the substrate, the changed system parameter being a further voltage at a detection electrode and the characteristic variable being a change of the quadrature value caused by the quadrature voltages as a function of the further voltage at the detection electrode. The data points are formed, in particular, by the difference between a quadrature produced by the first quadrature voltage and a quadrature produced by the second quadrature voltage, the data points being adapted, in particular, by a function including two model parameters. Quadrature electrodes are familiar, in principle, to those skilled in the art, from the related art. These are additional electrodes fixed to the substrate, which are able to compensate for undesirable deflections in the detection direction caused by mechanical quadrature effects. For example, the quadrature signal phase-shifted relative to the measured signal may be separated for this purpose by demodulation and the voltage at the quadrature electrodes may be regulated in such a way that the quadrature signal is minimized. The rotation rate sensor usually includes two quadrature electrodes for this purpose and the two quadrature voltages are, for example, applied differentially to the two electrodes. In the present specific embodiment of the method according to the present invention, a first quadrature voltage $V_{QP}$ is initially applied at the first quadrature electrode and amplitude $Q(V_{QP})$ of the quadrature signal produced as a result is determined. The first quadrature voltage is subsequently reset to zero, a second quadrature voltage $V_{QN}$ is applied to the second quadrature electrode and amplitude $Q(V_{QN})$ of the quadrature signal generated thereby is determined. Difference $Q_{diff}=Q(V_{QP})-Q(V_{QN})$ from the two quadratures is determined for each value of gradually changed voltage $V_{CM}$ at the detection electrode and results in the data points that subsequently serve as the "fingerprint" of the system and may be used for determining the detection sensitivity. In this way, the dependency of stiffness $K_{xy}(V_{CM})$ of voltage $V_{CM}$, in particular, may also be taken into account, which has been disregarded in the above-described specific embodiment. In this case, it may be assumed that the stiffness of $K_{xy}$ is a function of difference $V_{CM}-V_{QP/QN}$. This correlation may, in particular, be quadratically described with the aid of $K_{xy} \sim (V_{CM}-V_{QP/QN})^2$, the proportionality factor being provided by the compensation capability of the quadrature electrodes (quadrature compensation capability). Alternatively, the correlation may also be expressed by a linear relation $K_{xy} \sim V_{CM}-V_{QP/QN}$. In order to take this additional influence into account, the following dependency for the fitting may be used:

$$Q_{diff}(C_{CM}) = \frac{(V_{CM}-V_{QP,QN})^k}{\alpha - \beta V_{CM}^2}, k=1,2$$

In the case of constant stiffness, the expression for $Q(V_{CM})$ also results from the right side of this formula for the choice k=0. It is also possible in this case, to use higher powers k>2 for the adaptation.

According to one particularly preferred specific embodiment of the present invention, a change of the sensor properties, in particular, a drift of the detection sensitivity is determined on the basis of reference model parameters and the model parameter determined with the aid of the compensating calculation, the reference model parameters preferably corresponding to a progress of the data points in a reference state and the reference state being determined particularly preferably at an end-of-line calibration subsequent to the manufacture of the rotation rate sensor. The determination of the relationship $S_{SC}/S_{FT}$ of sensitivity $S_{SC}$ to sensitivity $S_{FT}$ determined by self-calibration, which is generated by the end adjustment (final trim) in the manufacturing process, preferably takes place with the aid of the following expression:

$$S_{SC}/S_{FT} = \lambda \frac{\beta_{SC}}{\beta_{FT}} \frac{\alpha_{FT}-\beta_{FT}V_{CM_{ref}}^2}{\alpha_{SC}-\beta_{SC}V_{CM_{ref}}^2}$$

In this case, $\alpha_{SC}$ and $\beta_{SC}$ denote the values of model parameters $\alpha$, $\beta$ determined with the aid of self-calibration, and $\alpha_{FT}$, $\beta_{FT}$ denote the values after the end adjustment. Furthermore, $V_{CM_{ref}}^2$ denotes a reference value for the electrode voltage and $\lambda$ is an additional parameter, which is established by the specific details of the sensor design and of the sensor operation. In addition, the model parameters determined with the method may be used to further improve the estimation of the drift or to obtain further pieces of information about the sensor properties at the point in time of the self-calibration (or of its change with respect to the reference standard).

According to one embodiment of the present invention, the system parameter is a voltage present at a detection electrode fixed to the substrate and the characteristic variable is a change of the quadrature value produced by this voltage, the voltage present at the detection electrode including, in particular, at least two phases and the change of the quadrature value being produced by variation of one or of both of the two phases.

A further subject matter of the present invention is a sensor system, in particular, a microelectromechanical sensor system, including a control and evaluation unit, the control and evaluation unit being configured to carry out the steps of the method according to the present invention. With the sensor system according to the present invention, it is possible to achieve the same technical effects and advantages as they have been described in conjunction with the method according to the present invention.

According to one embodiment of the sensor system according to the present invention, the sensor system includes a device for changing the system parameter and the control unit is configured to change at least one sensor parameter via the device based on the properties of the sensor system ascertained in the third step.

DETAILED DESCRIPTION OF EXAMPLE EMBODIMENTS

Figure 1:
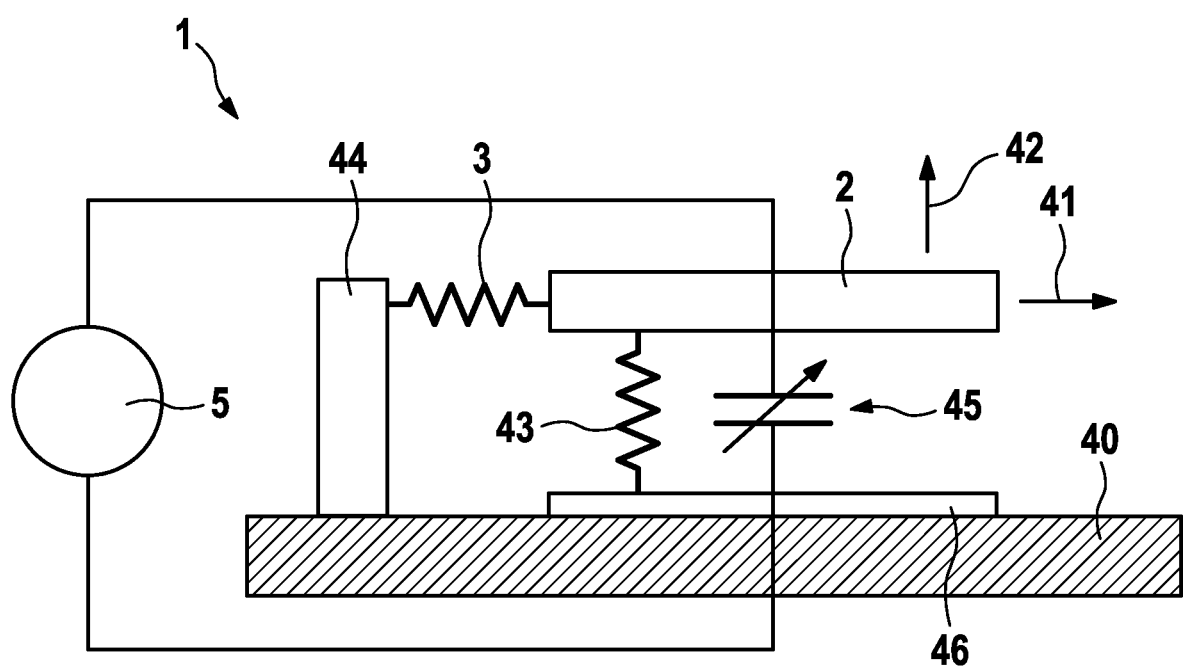
FIG. 1 schematically shows a representation of a sensor system including a resiliently mounted mass, whose deflection is measured by an electrode system fixed to the substrate.

A schematic representation of a sensor system 1 designed as a rotation rate sensor is depicted in FIG. 1. The system includes a substrate 40 and an oscillating mass 2, which is mounted via a mounting 44 fixed to the substrate and a spring arrangement 3 in an oscillatory manner with respect to substrate 40. Mass 2 may be excited to oscillate in a drive direction 41 in parallel to substrate 40. Due to a rotation rate present from the outside, velocity-related Coriolis forces act on mass 2, which cause an additional deflection in detection direction 42. In order to determine this deflection, the system includes a detection electrode 46 fixed to the substrate which, together with mass 2, forms a capacitive system, whose capacitance is a function of the distance between mass 2 and electrode 46 and may be measured via a voltage $V_{CM}$ 5 present between mass 2 and electrode 46. A change of this voltage 5 influences the electrostatic properties of system 1 and modifies, in particular, the rest position of mass 2 and the correlation between resetting force and deflection in detection direction 42. Thus, the electrostatic contribution to the electromechanical stiffness of vibratory system 1 in the detection direction may be changed via voltage 5 (indicated by spring symbol 43). This mechanism allows, in particular, the natural frequency to be influenced in a targeted manner with respect to detection direction 42. With this aid of a gradual change of voltage 5, it is possible to determine a characteristic progress $Q(V_{CM})$ of the quadrature signal as a function of voltage 5, which may be used as a type of "fingerprint" of the system and, in particular, allows for conclusions to be drawn about a change of the detection sensitivity.

Figure 2:
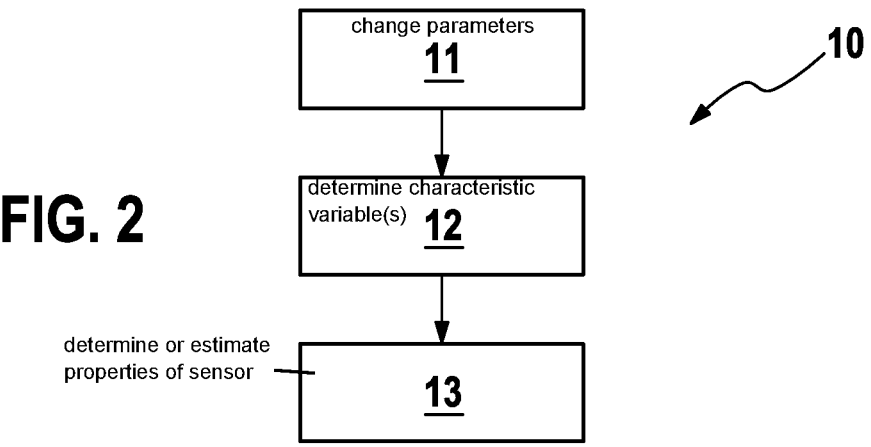
FIG. 2 schematically shows a representation of the method according to an example embodiment of the present invention.

A schematic representation of method 10 according to the present invention is shown in FIG. 2. Sensor system 1 in this case includes one or multiple parameters $P_i$, i=1, . . . , n, which may be changed in a fixed manner and, in particular, may each assume different values $P_i(W_j)$, j=1, . . . , $n_i$. Prior to first step 11 of method 10, the parameters have an initial value $P_i(W_1)$ and are then changed in first step 11 in such a way that they assume one or multiple values $P_i(W_1) \rightarrow P_i(W_j)$, j=2, . . . , $n_i$ differing from $P_i(W_1)$. In determination step 12, one or multiple characteristic variables $C_k$, k=1, . . . , m of the system is/are determined for each value or combination of values of the system parameters, so that a data set $C_{k,j_1, \ldots, j_n}$ results that includes the respective value of n-th characteristic variable $C_k$, which results after the change $P_i(W_1) \rightarrow P_i(W)$ of system parameter $P_i$. Thus, in step 13, certain properties E of sensor 1 may be determined or estimated $E=f(C_{k,j_1, \ldots, j_n})$ with the aid of data set $C_{k,j_1, \ldots, j_n}$ and on the basis of an underlying physical understanding or of suitable empirical correlations. This procedure may be repeated at an arbitrary point in time $t_l$, l=1, . . . , o, among other things, an initial implementation after the end adjustment, a further after start-up and thereafter at regular intervals during the service life of the sensor is possible. This results in a data set $C(t_l)_{k,j_1, \ldots, j_n}$, which allows not only properties of sensor 1 to be determined at various point in time $t_l$, but also changes of properties to be determined $\Delta E(t_{l_1} \rightarrow t_{l_2}) = f(C(t_l)_{k,j_1, \ldots, j_n} \rightarrow C(t_l)_{k,j_1, \ldots, j_n})$ between various points in time $t_{l_1}, t_{l_2}$ and for monitoring, diagnosing and self-calibrating the sensor system during the service life.

Figure 3:
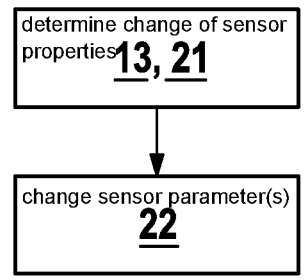
FIG. 3 schematically shows a representation of the self-calibration of the sensor system, in accordance with an example embodiment of the present invention.

The sequence of a self-calibration of sensor 1 is represented in FIG. 3. The self-calibration involves an embodiment of method 10 according to the present invention, where in third step 13, a determination 21 of the change of the sensor properties with respect to a reference state takes place. The reference state in this case may be determined, in particular, during the end adjustment subsequent to the manufacture of sensor system 1. In this way, method 10 may be used to determine the change of the properties of sensor system 1 with respect to a reference state at point in time $t_1$, $\Delta E(t_1 \rightarrow t_l) = f(C(t_1)_{k,j_1, \ldots, j_n} \rightarrow C(t_l)_{k,j_1, \ldots, j_n})$. In a step 22 following third step 13, at least one sensor parameter is then changed, the change being capable, for example, of effectuating a correction of a measured signal of the sensor system. In this way, a targeted change of one or of multiple sensor parameters $P_i(W_1) \rightarrow P_i(W_{j_i})$ may be carried out in step 22, with the aim of correcting changed sensor properties $E(t_1, P_i(W_1)) \approx E(t_l, P_i(W_{j_i}))$. One typical application here would be, for example, a self-calibration of the sensitivity of sensor system 1 carried out at regular intervals in order to achieve an accuracy preferably constant over the entire service life.

Figure 4:
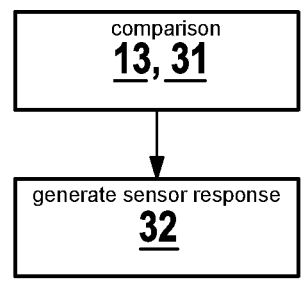
FIG. 4 schematically shows a representation of the monitoring of the sensor properties, in accordance with an example embodiment of the present invention.

A monitoring of sensor system 1 is represented in FIG. 4 as a further embodiment of method 10 according to the present invention. To monitor the sensor properties, a comparison 31 is carried out in third step 13, in which the value of the characteristic variable at point in time $t_l$ (or the change of this variable with respect to a reference state) is compared with a threshold value. In comparison 31, it is checked whether the characteristic variable is below or above the threshold value ($C(t_l)_{k,j_1, \ldots, j_n} \leq$ Const. or $C(t_l)_{k,j_1, \ldots, j_n} >$ Const.). As a function of this comparison 31, a sensor response is then generated in a subsequent step 32:

$$S(t_l) = \begin{cases} 0 \leftrightarrow C(t_l)_{k,j_1, \ldots, j_n} \leq \text{Const.} \\ 1 \leftrightarrow C(t_l)_{k,j_1, \ldots, j_n} > \text{Const.} \end{cases}$$

One possible application here would be a monitoring of the correct operability of the sensor system and, in the case of a no longer acceptable deviation, the triggering of a suitable message to the user.

Figure 5:
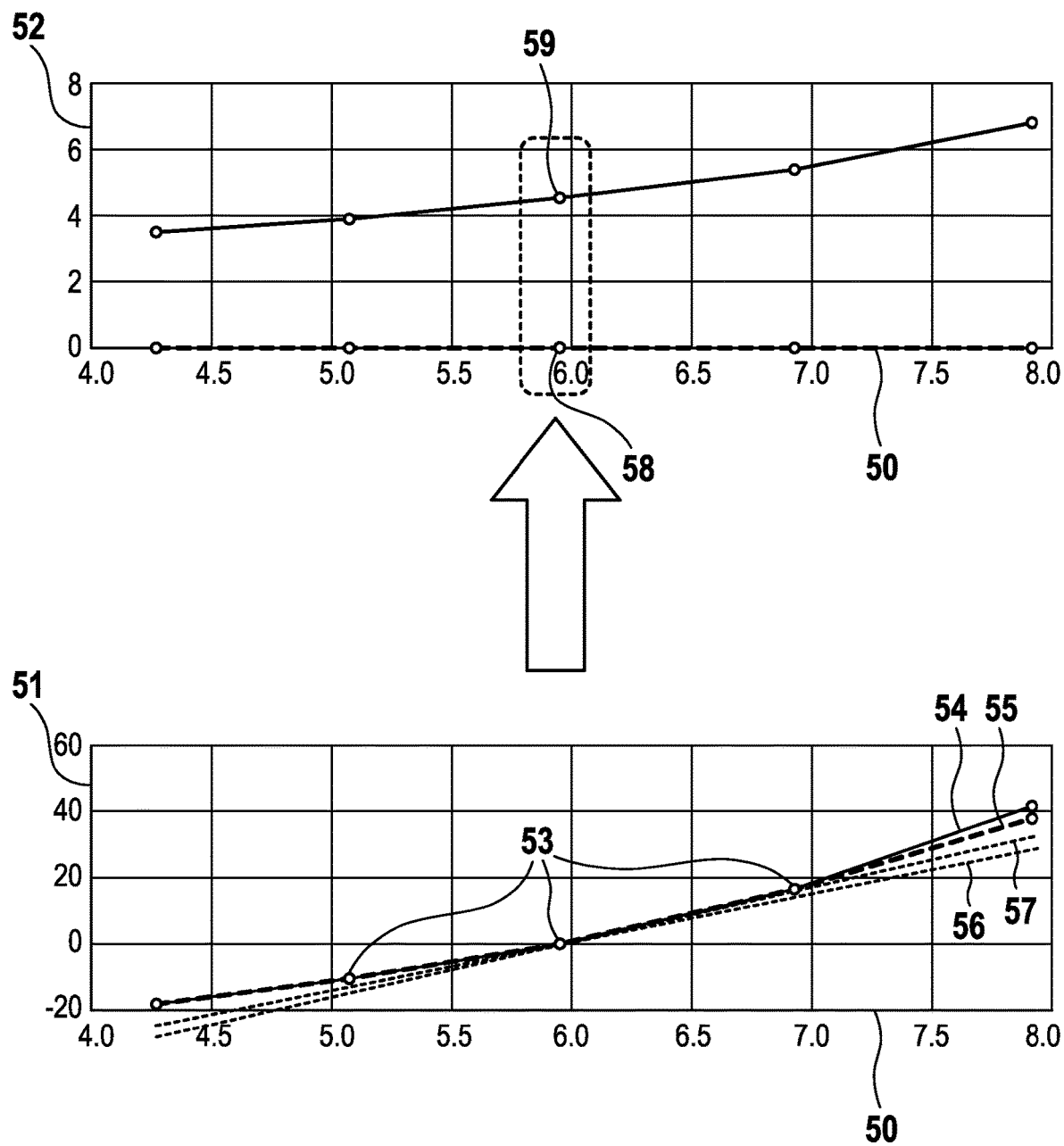
FIG. 5 illustrates the determination of the sensitivity change by the progress of the quadrature as a function of the electrode voltage.

FIG. 5 illustrates the determination of the sensitivity change with the aid of the quadrature as a function of electrode voltage $V_{CM}$. In the lower graphic, vertical axis 51 corresponds to the measured relative change of the quadrature, whereas vertical axis 52 in the upper graphic corresponds to the relative deviation of the detection sensitivity determined therefrom. In both cases, electrode voltage $V_{CM}$ is plotted on respective horizontal axis 50. Within the scope of a self-calibration, a gradual change of electrode voltage 5 is carried out and a measurement of the associated quadrature values results in data points 53 shown, which reflect progress 54 of the relative change of the quadrature as a function of voltage 5. Since the corresponding correlation reacts sensitively to changes of the sensor, in particular, to a drift of the detection sensitivity, progress 54 may be used as a type of "fingerprint," at which a sensitivity drift may be read out. In the case shown, a slight change is revealed by a comparison of reference curve 54 with curve 55 determined in the end calibration of the manufacturing process, which is reflected in particular, in a difference between the slopes of associated tangents 57 and 56. In turn, the relative deviation of the detection sensitivity from the reference value is plotted in the upper graphic (the values belonging to reference curve 54 are thus constantly zero and coincide with the horizontal axis). The difference between sensitivities 58 and 59 correlates with the different tangent slopes in the lower graphic, so that the "fingerprint" determined by the self-calibration may be used for estimating the sensitivity drift.

What is claimed is:

1. A method for determining and/or measuring and/or monitoring properties of a sensor system, the method comprising the following:
   in a first step, a controlled change of at least one system parameter of the sensor system taking place in such a way that prior to the controlled change, the system parameter includes a first value and assumes at least one further value as a result of the controlled change, wherein the controlled change of the at least one system parameter of the sensor system includes multiple targeted incremental changes of the at least one system parameter;
   in a second step, determining at least one characteristic variable of the sensor system and/or a change of the at least one characteristic variable of the sensor system, for the at least one further value of the system parameter;
   in a third step, determining and/or measuring and/or monitoring of properties of the sensor system based on the at least one further value of the system parameter and based on the at least one characteristic variable determined in the second step and/or based on the change of the at least one characteristic variable.

2. The method as recited in claim 1, wherein in the third step, a change of the properties of the sensor system is determined with respect to a reference state, the reference state being determined during an end adjustment subsequent to the manufacture of the sensor system.

3. The method as recited in claim 2, wherein in a step following the third step, at least one sensor parameter is changed, the change of the sensor parameter effectuating a correction of a measured signal of the sensor system.

4. The method as recited in claim 1, wherein in the third step, a comparison of the characteristic variable of the sensor system determined in the second step and/or the change of the at least one characteristic variable, with a threshold value is carried out, a sensor response being generated in a subsequent step.

5. The method as recited in claim 1, wherein the sensor includes a movable structure, which is configured in such a way that as a result of a physical stimulus acting on the movable structure, a deflection of the movable structure is effectuated in a detection direction, the system parameter changed in the first step in a controlled manner directly influencing the deflection generated by the physical stimulus and/or a measured signal read out from the sensor system.

6. The method as recited in claim 5, wherein the physical stimulus is an inertial force or a gas pressure or a liquid pressure.

7. The method as recited in claim 5, wherein the changed system parameter is a potential present between the movable structure and a readout structure, the potential being an electrode voltage present between an electrode fixed to a substrate and the movable structure of the sensor system.

8. The method as recited in claim 1, wherein the changed system parameter is an operating temperature of the sensor system, the change of the operating temperature taking place as a result of a targeted change of an operating mode of the sensor system or of parts of the sensor system.

9. The method as recited in claim 8, wherein the parts of the sensor system include evaluation electronics.

10. The method as recited in claim 5, wherein the characteristic variable determined in the second step corresponds to the measured signal without an external physical stimulus.

11. The method as recited in claim 1, wherein the sensor system is a rotation rate sensor and includes a movable structure which is configured in such a way that it is excitable for carrying out a drive movement, the drive movement proceeding along a drive direction differing from a detection direction.

12. The method as recited in claim 11, wherein the changed system parameter is an oscillation amplitude of the movable structure.

13. The method as recited in claim 11, wherein the characteristic variable determined in the second step is a phase position of a detection oscillation of the movable structure with respect to a drive oscillation of the movable structure.

14. The method as recited in claim 11, wherein a deflection in the detection direction and the drive movement are coupled in such a way that the drive movement causes a quadrature deflection, which is in phase with the drive movement, the characteristic variable of the sensor system being a quadrature value.

15. The method as recited in claim 14, wherein in the third step, at least two data points are generated based on the characteristic variable of the sensor system determined in the second step and/or based on the change of the at least one characteristic variable, a model function being adapted to the data points using a compensating calculation, the model function containing at least one model parameter, which is fixed at a value by the compensating calculation, the determination and/or measuring and/or monitoring of properties of the sensor system taking place based on a value of the model parameter.

16. The method as recited in claim 15, wherein the system parameter is an electrode voltage and the data points are formed by an inverse of the quadrature values and by associated electrode voltages.

17. The method as recited in claim 15, wherein a first quadrature voltage is applied between the movable structure and a first quadrature electrode fixed to a substrate, and a second quadrature voltage is subsequently applied between the movable structure and a second quadrature electrode fixed to the substrate, the changed system parameter being a further voltage at a detection electrode and the characteristic variable being a change of the quadrature value produced by the quadrature voltages as a function of the further voltage at the detection electrode.

18. The method as recited in claim 14, wherein the system parameter is a voltage present at a detection electrode fixed to a substrate, and the characteristic variable is a change of the quadrature value produced by the voltage, the voltage present at the detection electrode including at least two phases and the change of the quadrature value being produced by variation of one or of both of the two phases.

19. A sensor system, comprising:
a control and evaluation unit configured to determine and/or measure and/or monitor properties of a sensor system, the control and evaluation unit being configured to perform the following:
in a first step, a controlled change of at least one system parameter of the sensor system taking place in such a way that prior to the controlled change, the system parameter includes a first value and assumes at least one further value as a result of the controlled change, wherein the controlled change of the at least one system parameter of the sensor system includes multiple targeted incremental changes of the at least one system parameter;
in a second step, determining at least one characteristic variable of the sensor system and/or a change of the at least one characteristic variable of the sensor system, for the at least one further value of the system parameter;
in a third step, determining and/or measuring and/or monitoring of properties of the sensor system based on the at least one further value of the system parameter and based on the at least one characteristic variable determined in the second step and/or based on the change of the at least one characteristic variable.

20. The sensor system as recited in claim 19, wherein the sensor system is a microelectromechanical sensor system.

21. The sensor system as recited in claim 19, wherein the sensor system includes a device for changing the system parameter, and the control unit and evaluation unit is configured to change at least one sensor parameter via the device based on the properties of the sensor system ascertained in the third step.

* * * * *